(12) United States Patent
Koch et al.

(10) Patent No.: US 8,786,995 B2
(45) Date of Patent: Jul. 22, 2014

(54) SURGE CURRENT SUPPRESSING CIRCUIT

(75) Inventors: René Frederik Koch, New Taipei (TW);
Min-Ta Hsiao, New Taipei (TW);
Ming-Cheng Chuang, New Taipei (TW)

(73) Assignee: Leader Electronics Inc., New Taipei (TW)

( * ) Notice: Subject to any disclaimer, the term of this patent is extended or adjusted under 35 U.S.C. 154(b) by 413 days.

(21) Appl. No.: 13/171,841

(22) Filed: Jun. 29, 2011

(65) Prior Publication Data

US 2013/0003235 A1    Jan. 3, 2013

(51) Int. Cl.
*H02H 9/00*    (2006.01)

(52) U.S. Cl.
USPC ......................................................... 361/117

(58) Field of Classification Search
USPC ......................................................... 361/117
See application file for complete search history.

(56) References Cited

U.S. PATENT DOCUMENTS

| | | | |
|---|---|---|---|
| 4,389,695 A | | 6/1983 | Carpenter, Jr. |
| 4,868,505 A | * | 9/1989 | Stahl ............................ 324/511 |
| 4,901,183 A | | 2/1990 | Lee |
| 5,663,636 A | * | 9/1997 | Falldin et al. ................. 323/361 |
| 6,246,182 B1 | * | 6/2001 | Yamasaki et al. .......... 315/209 R |
| 7,088,827 B1 | * | 8/2006 | Vishwamitra ..................... 381/1 |

FOREIGN PATENT DOCUMENTS

| | | |
|---|---|---|
| CN | 2013880859 Y | 1/2010 |
| JP | 2010027237 A | 2/2010 |

OTHER PUBLICATIONS

English Language Abstract of CN2013880859Y, Jan. 20, 2010.
English Language Abstract of JP2010027237A, Feb. 4, 2010.
European Search Report for Application No. EP11005503.5 mailed Nov. 22, 2011.

* cited by examiner

*Primary Examiner* — Stephen W Jackson
(74) *Attorney, Agent, or Firm* — Abe Hershkovitz; Hershkovitz & Associates, PLLC

(57) ABSTRACT

A surge current suppressing circuit is applied between an AC power and an electronic device that receives the AC power via a first AC power line and a second AC power line. The surge current suppressing circuit has a first input fuse connected to the first AC power line, and a first air-core inductor connected in series with the first input fuse on the first AC power line to suppress a surge current. Depending upon the practical applications, the surge current suppressing circuit can further have a second air-core inductor connected to the second AC power line, a capacitor connected between the two AC power lines or both.

6 Claims, 2 Drawing Sheets

SURGE CURRENT SUPPRESSING CIRCUIT

BACKGROUND OF THE INVENTION

1. Field of the Invention

The present invention relates to a surge current suppressing circuit, and more particularly to a surge current suppressing circuit using an air-core inductor to suppress an inrush current.

2. Description of Related Art

With reference to FIG. 5, a traditional approach for anti-lightning mainly relies on adding a metal-oxide-varistor (MOV) 50 after an input fuse 51. During normal operations, the MOV 50 presents itself as a high impedance and is just like an open-circuit, isolated from and not influencing the circuit operation. As lightning surge strikes and comes into the circuit from the AC power lines, the MOV 50 will be activated by this high surge voltage and turned into low impedance, shunting and absorbing high energy to itself to protect a following circuit.

Though featuring with high energy absorbing capacity and quick reaction time, the MOV 50 has a service-life problem. The characteristics of the MOV 50 will deteriorate with the number of times of activation, for example, activation voltage will become lower and lower and leakage current will gradually increase. When the activation voltage decreases to be close to a normal operating voltage of the circuit, the MOV 50 may be quite often activated by the normal operating voltage and eventually becomes overheated and damaged, or even gets on fire. Thus in application it is sometimes needed to place a thermal fuse 52 to work together with MOV 50, wherein the thermal fuse 52 will be activated first and isolate the MOV 50 before the MOV 50 gets overheated.

As described above, there will be an instantaneous high impulse current flowing into the MOV 50 when the lightning surge strikes. The big current will also pass through the input fuse 51. In order to cope with this high impulse current, the input fuse 51 needs to have high "melting integral" ($I^2t$) to withstand the large current and not to be burned out. However, high melting integral usually also means high current rating, thus resulting in using a fuse with much higher current rating than needed. To cope with this, sometimes an extra fuse 53 with adequate current rating will be put after the MOV 50 to protect the circuit.

Furthermore, safety rules require a "single-fault test." During the short-circuit test, there will be a very high current flowing into the fuse. To avoid arcing or getting on fire, a fuse with high breaking capacity has to be used. This kind of high breaking capacity fuse has bigger size and higher cost, moreover, to have the same melting integral level, high breaking capacity fuses need to be made with much higher current rating than the normal ones.

SUMMARY OF THE INVENTION

The main objective of the present invention is to provide a surge current suppressing circuit that protects an electronic device from being impacted by an inrush current.

The surge current suppressing circuit is applied between an AC power and an electronic device that receives the AC power via a first AC power line and a second AC power line. Basically, the surge current suppressing circuit has a first input fuse connected to the first AC power line, and a first air-core inductor connected in series with the first input fuse on the first AC power line to suppress a surge current.

However, depending upon the practical applications, the surge current suppressing circuit can further have a second air-core inductor connected to the second AC power line, a capacitor connected between the two AC power lines or both.

When lightning surge strikes and comes into the suppressing circuit from the AC power lines, the air-core inductor will suppress the instantaneous surge current and withstand the high lightning voltage, thus lessening the impact of the lightning energy on the electronic device.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
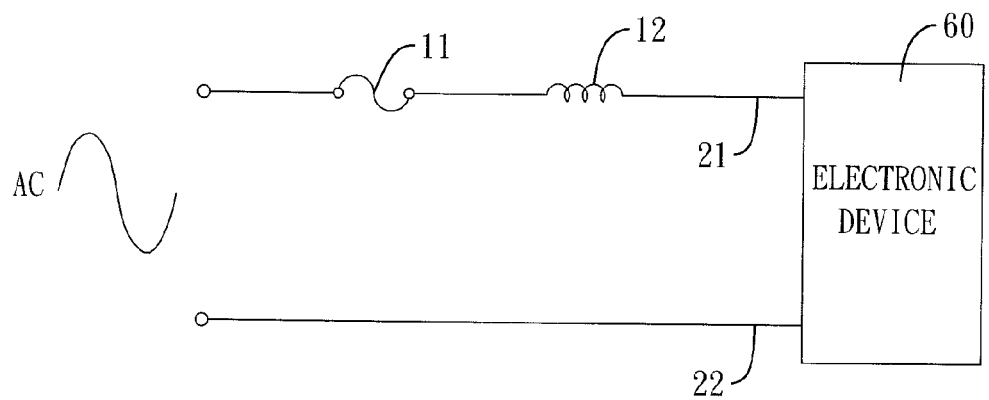
FIG. 1 is a circuit diagram of a first embodiment of a surge current suppressing circuit in accordance with the present invention.

With reference to FIG. 1, a surge current suppressing circuit of the present invention is applied between an AC power and an electronic device or circuit 60 to be protected. The electronic device 60 may be any device receiving the AC power via a first AC power line 21 and a second AC power line 22 and is not limited to any particular application. For example, the electronic device 60 may be a power supply, a power adapter, etc. The surge current suppressing circuit comprises an input fuse 11 and a first air-core inductor 12, both connected in series on the first AC power line 21.

According to the characteristic $$v(t) = L\frac{di(t)}{dt},$$

an inductor is able to oppose changes in electrical current through the inductor developing a voltage across itself. The voltage is proportional to the rate of change of the electrical current. Therefore, when lightning surge strikes and comes into the suppressing circuit from the AC power lines 21, 22, the di/dt characteristic of the first air-core inductor 12 suppresses the instantaneous surge current. The air-core inductor 12 withstands the high lightning voltage, thus to a great extent lessens the impact of the lightning energy on the following electronic device 60. Using the air-core type inductor is to avoid the saturation problem during surge.

Figure 2:
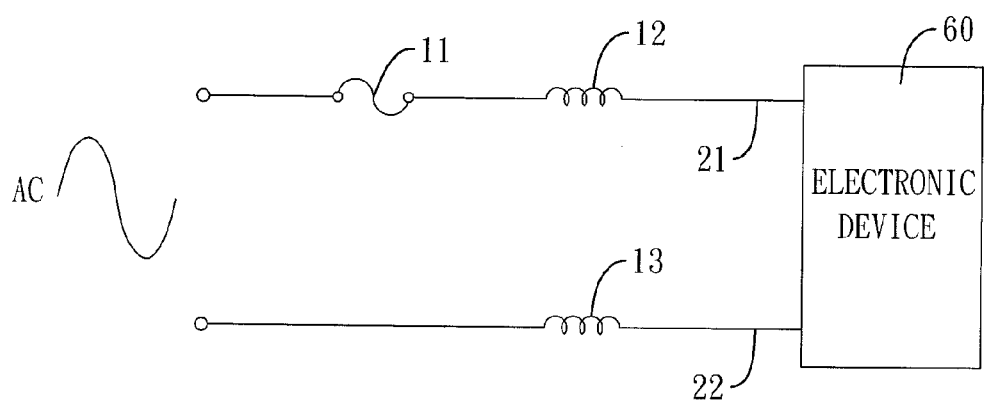
FIG. 2 is a circuit diagram of a second embodiment of a surge current suppressing circuit in accordance with the present invention.
Figure 3:
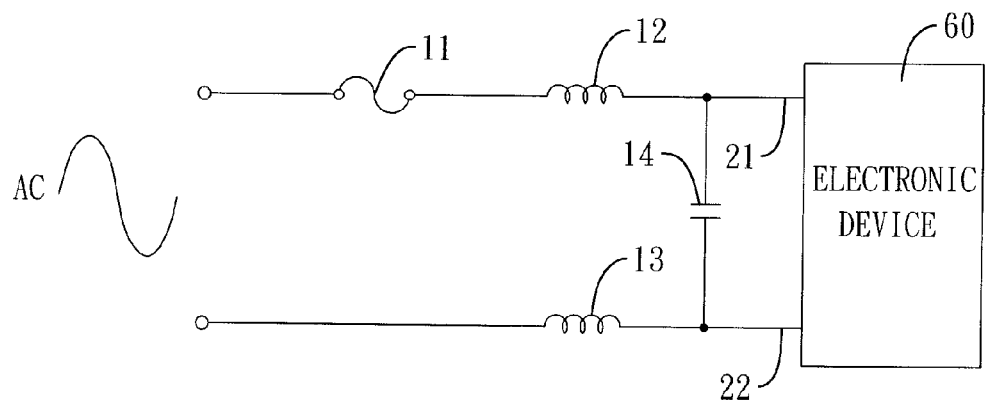
FIG. 3 is a circuit diagram of a third embodiment of a surge current suppressing circuit in accordance with the present invention.
Figure 4:
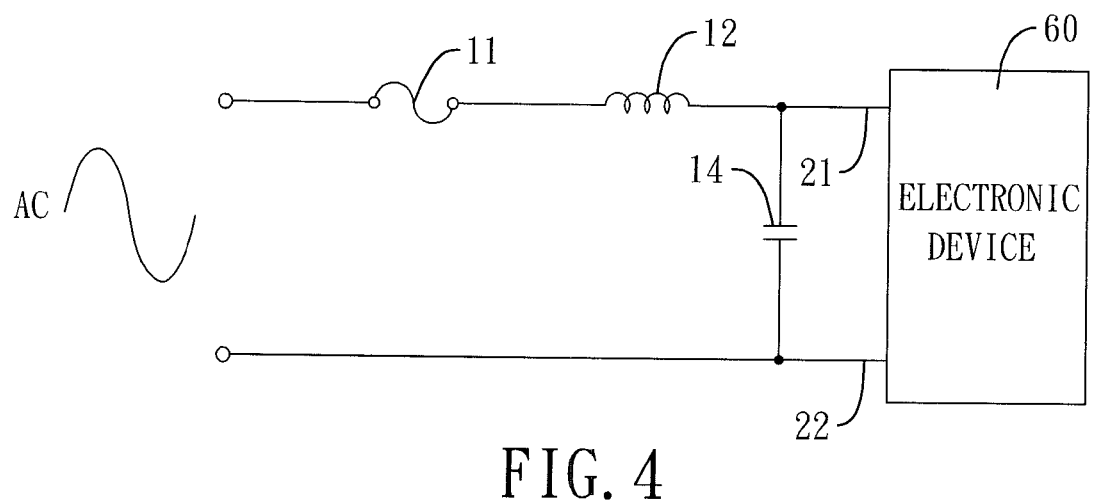
FIG. 4 is a circuit diagram of a fourth embodiment of a surge current suppressing circuit in accordance with the present invention.
Figure 5:
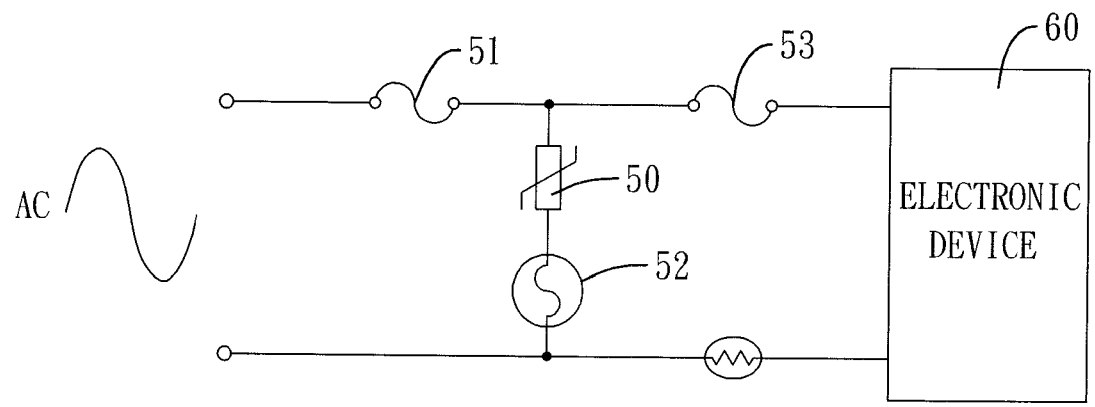
FIG. 5 is a circuit diagram of a conventional surge current suppressing circuit.

Depending upon practical situations or requirements such as power, available area for mounting the surge current suppressing circuit, EMI, etc., a second air-core inductor 13 may be used and connected to the second AC power line 22 as shown in FIGS. 2 and 3. If needed, a capacitor 14 can be added and connected between the two AC power lines 21, 22 to reduce electromagnetic interference (EMI).

Comparing to the conventional anti-surge current approach, the present invention has the following advantages:

1. Without the MOV, there is no risk with the MOV service-life problem.

2. Without the MOV, the thermal fuse is unnecessary.

3. Using the air-core inductor to limit the current, there will be no need to use a fuse of high melting integral level. Therefore, a reasonable current rating fuse can be used.

4. In the "single-fault" short-circuit test, the air-core inductor will limit the peak value of the short-circuit current, therefore there is no need to use a "high-breaking capacity" fuse.

5. There is no need to use a negative temperature coefficient (NTC) resistor to limit the inrush current since the air-core inductor will achieve this function.

6. With the air-core inductor, the stress by the lightning energy on the protected electronic device and components will be much lessened. Therefore it is possible to use components such as rectifying diodes and input capacitor of lower rating in the electronic device.

7. The configuration of the surge current suppressing circuit is very simple, reliable and effective.

8. In addition to suppressing the surge current, the EMI is also lowered.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A surge current suppressing circuit applied between an AC power and an electronic device that receives the AC power via a first AC power line and a second AC power line, the surge current suppressing circuit comprising:
    a first input fuse connected to the first AC power line;
    a first air-core inductor connected in series with the first input fuse on the first AC power line between the AC power and the electronic device to suppress a surge current flowing to the first AC power line and the second AC power line.

2. The surge current suppressing circuit as claimed in claim 1, further comprising a second air-core inductor connected to the second AC power line between the AC power and the electronic device.

3. The surge current suppressing circuit as claimed in claim 1, further comprising a capacitor connected between the first AC power line and the second AC power line.

4. The surge current suppressing circuit as claimed in claim 2, further comprising a capacitor connected between the first AC power line and the second AC power line.

5. The surge current suppressing circuit as claimed in claim 3, wherein the capacitor is provided between the first air-core inductor and the electronic device.

6. The surge current suppressing circuit as claimed in claim 4, wherein the capacitor is provided between the first air-core inductor and the electronic device.

\* \* \* \* \*